US 6,698,464 B2

(12) United States Patent
Hennemann, Jr. et al.

(10) Patent No.: US 6,698,464 B2
(45) Date of Patent: Mar. 2, 2004

(54) PRODUCT DISPENSER

(75) Inventors: Thomas L. Hennemann, Jr., Winston Salem, NC (US); Roberto Ichaustequi, Summerfield, NC (US); Daniel F. Brady, High Point, NC (US)

(73) Assignee: Kay Chemical, Inc., Greensboro, NC (US)

( * ) Notice: Subject to any disclaimer, the term of this patent is extended or adjusted under 35 U.S.C. 154(b) by 30 days.

(21) Appl. No.: 10/139,612

(22) Filed: May 2, 2002

(65) Prior Publication Data

US 2003/0205286 A1 Nov. 6, 2003

(51) Int. Cl.[7] .............................................. B65B 1/04
(52) U.S. Cl. ..................... 141/9; 141/100; 239/316; 222/478
(58) Field of Search .................. 141/9, 100, 2, 141/18, 391; 239/310, 316; 222/651, 652, 169, 457.5, 477, 478, 480, 565; 4/222, 227.1, 222.1

(56) References Cited

U.S. PATENT DOCUMENTS

| 1,681,362 A | * | 8/1928 | Pike ........................ 422/282 |
|---|---|---|---|
| 3,742,965 A | * | 7/1973 | Hudziak ...................... 134/92 |
| 3,817,709 A | | 6/1974 | Ramge |
| 4,597,941 A | * | 7/1986 | Bottom et al. ................ 422/37 |
| 4,759,907 A | | 7/1988 | Kawolics et al. |
| 5,332,014 A | * | 7/1994 | Feig ......................... 141/110 |
| 5,395,625 A | | 3/1995 | Tang |
| 5,699,827 A | | 12/1997 | Delorme et al. |
| 5,916,533 A | | 6/1999 | Ruta et al. |
| 6,048,501 A | | 4/2000 | Lemaire et al. |
| 6,183,631 B1 | | 2/2001 | Cormier et al. |
| 6,387,870 B1 | | 5/2002 | Klaers et al. |

FOREIGN PATENT DOCUMENTS

| EP | 0659956 | 6/1995 |
|---|---|---|
| NL | 7904220 | 2/1980 |
| WO | WO 00/41608 | 7/2000 |

* cited by examiner

*Primary Examiner*—Steven O. Douglas
(74) *Attorney, Agent, or Firm*—Merchant & Gould (57) ABSTRACT

A product dispenser, solid product, and a dispensing system containing the product dispenser and solid product are disclosed. Methods for using the product dispenser, solid product, and dispensing system are also disclosed.

42 Claims, 6 Drawing Sheets

PRODUCT DISPENSER

FIELD OF THE INVENTION

The present invention relates to a product dispenser for dispensing a product.

BACKGROUND OF THE INVENTION

Liquid products, such as liquid cleaning products, are used throughout residential and commercial properties in a variety of applications. Although liquid products have tremendous utility, liquid products have a number of shortcomings. One primary shortcoming is the bulkiness and weight of liquid products. Packaged liquid products are usually either made relatively small to keep the weight low, or made relatively large causing an undesirable increase in product weight.

What is needed in the art is an improved method of preparing a liquid product for use in residential, commercial, and industrial applications.

SUMMARY OF THE INVENTION

The present invention addresses some of the difficulties and problems discussed above by the discovery of an improved product dispenser and methods of using the product dispenser. The product dispenser of the present invention may be used to prepare a liquid solution, such as a cleaning or sanitizing solution, having a desired concentration of active ingredients. The liquid solution is prepared from a solid product, which dissolves at a controlled rate to produce a desired amount of liquid solution having a desired concentration.

Accordingly, the present invention is directed to a product dispenser and a method of making the product dispenser. The present invention is also directed to solid products, which may beused in the product dispenser, and the combination of the product dispenser with one or more solid products.

The present invention is further directed to a method of making a liquid solution using the product dispenser. The method provides a liquid solution having a desired concentration of one or more active ingredients.

These and other features and advantages of the present invention will become apparent after a review of the following detailed description of the disclosed embodiments and the appended claims.

DETAILED DESCRIPTION OF THE INVENTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention relates to a product dispenser for forming a liquid "use" solution from a water and solid product mixture. As used herein, the terms "use solution" and "liquid use solution" refer to an aqueous solution resulting from the interaction of water and a solid product within a product dispenser of the present invention. The present invention further relates to solid products for use in the product dispenser, and dispensing systems comprising the product dispenser and the solid product. Desired use solutions may be prepared using the dispensing systems of the present invention as described below.

I. Product Dispenser

The present invention is directed to a product dispenser. The product dispenser enables the interaction of water with one or more water-dissolvable solid products. The product dispenser may have any configuration, shape and size, which enable water to come into contact with the one or more water-dissolvable solid products. Although reference may be made to a particular size and shape, it should be understood that the product dispenser of the present invention is not limited in any way to a particular design, size or shape.

The product dispenser of the present invention comprises a number of components. In one embodiment, the product dispenser of the present invention comprises (i) a housing having a cavity configured and arranged to receive a solid product, wherein the housing has a bottom, a top, and at least one side defining the cavity; (ii) an inlet for inputting water into the housing, wherein the inlet and the cavity are configured so as to provide fluid flow between the inlet and the cavity; (iii) a support member positioned within the cavity, wherein at least a portion of the support member is positioned at a distance, d, above the bottom of the housing; (iv) an outlet on a first side of the housing; and (v) a drain hole on the bottom of the housing. Each component of the product dispenser provides a given function so as to produce a desired use solution having a desired concentration of solid product therein.

The product dispenser of the present invention may be positioned relative to a water source for supplying water to the product dispenser and one or more containers for collecting the use solution and any residual solution exiting the drain hole of the product dispenser. In one embodiment, the product dispenser may be attached to a surface, such as a wall, using any conventional securing means including, but not limited to, screws, nails, nuts/bolts, adhesives, or a combination thereof. In another embodiment of the present invention, the product dispenser may comprise a bracket for attaching the product dispenser to a surface adjacent to or accessible to a water source. The bracket may be an integral part of the housing (e.g., the bracket and housing are one continuous molded part) or the bracket may be a separate component, which is connected to the housing. The bracket may be attached to a surface (and the housing) using conventional securing means as described above, or may be configured to temporarily mount onto the surface, such as a partition in a two-compartment sink.

In one desired embodiment of the present invention, the bracket is an arm configured and arranged to engage a ledge of a partitioned sink such that the housing extends into one compartment of the partitioned sink, and the adjustable outlet and the drain hole of the product dispenser empty into the compartment. In a further desired embodiment of the present invention, the bracket is configured to engage a rim of a bucket (i.e., a mop bucket) or other portable container, which may be used to collect a use solution. In yet a further desired embodiment of the present invention, the bracket is configured so that the product dispenser may be hung from a faucet or other piping, which is connected to a water source. In each of the above embodiments, the bracket may be an integral part of the housing or may be a separate component, which is connected to the housing via a mechanical device such as described above.

In other embodiments of the present invention, the size and shape of the product dispenser may be designed to match a given water source and/or a container for collecting the use solution. For example, the product dispenser may have a circular shape and size such that the product dispenser fits snugly onto an upper surface of a mop bucket or other container. A handle may be connected to the product dispenser for carrying the product dispenser, placing the product dispenser onto the container (i.e., mop bucket), and for removing the product dispenser from the container.

The outlet of the product dispenser may be a fixed (i.e., not movable) component of the housing or may include an overflow adjustment plate to control the water flow within the product dispenser. For an application in which a known concentration of use solution is desired and the product dispenser is only used for the single application, a user may desire a product dispenser having a fixed outlet. For an application in which the same product dispenser is used to product multiple use solutions having varying concentrations of solid product therein, a user may desire a product dispenser having an adjustable outlet. The overflow adjustment plate may be positioned to move vertically along a track in a side wall of the housing to control the height of the water in the product dispenser. As discussed below, the overflow adjustment plate may be one way to control the concentration of solid product in the resulting use solution.

The product dispenser of the present invention may also comprise one or more partitions within the housing. One or more partitions within the housing may be used to control water flow through the product dispenser. In one embodiment, the product dispenser comprises a partition positioned vertically within the housing, wherein the partition separates a cavity of the product dispenser from a water inlet of the product dispenser. In this embodiment, water flows from the inlet into the cavity of the housing by passing beneath a lower edge of the partition. A controlled flow of water is brought into contact with one or more pieces of solid product positioned on the support member.

The support member may have a solid continuous structure, such as a metal foil or plastic film, or may have a discontinuous, permeable structure, such as a mesh or screen formed from materials including, but not limited to, metals, plastics, and combinations thereof. In one embodiment of the present invention, the support member comprises a continuous structure in a horizontal plane within the cavity of the product dispenser, wherein the upper surface area of the support member is less than the surface area of the horizontal plane such that water may flow through the horizontal plane from below the continuous structure to contact the water-dispersible product positioned on the continuous structure. It should be noted that the support member may have a configuration other than one which is within a single horizontal plane within a cavity of the product dispenser. For example, the support member may have a V-shape, U-shape, W-shape or any other configuration as long as the support member is capable of supporting a water-dispersible product within the product dispenser.

In a further embodiment of the present invention, the support member comprises a permeable structure in a horizontal plane within the cavity of the product dispenser, wherein the upper surface area of the support member is less than or equal to the surface area of the horizontal plane such that water may flow through or around the support member from below the permeable structure to contact the water-dispersible product positioned on the support member. As discussed above, the permeable support member may have a configuration other than one which is within a single horizontal plane within a cavity of the product dispenser. For example, the permeable support member may have any of the configurations described above (i.e., V-shape, U-shape, W-shape, or other shape).

A portion of the support member may be positioned at a distance, d, above the bottom of the housing. For support members having a V-shape, U-shape, or W-shape as described above, the lower portion of the support member may actually rest on an upper surface of the bottom of the housing. In other embodiments, the lower portion of the support member having a V-shape, U-shape, or W-shape may be at a distance, d, above the bottom of the housing, while an upper portion of the support member is positioned at a distance, (d+t), above the bottom of the housing, wherein t represents the thickness of the support member.

The product dispenser of the present invention may further comprise one or more coverings along the top of the housing. A single covering may be used to cover the cavity and/or the inlet of the housing. Desirably, a covering is used to cover the cavity of the housing to protect any solid product in the cavity from accidental exposure to liquids, such as water. In one embodiment of the present invention, a covering is used to cover the cavity of the housing, wherein the covering expands an area having a perimeter outlined by a partition and the at least one side of the housing. Each of the one or more coverings may be separate from and removable from the product dispenser or may be attached to the product dispenser using any conventional method of attaching. In one embodiment, a hinge is used to attach a covering over the cavity of the product dispenser. Further, a portion of the covering may form a bracket (as described above), which may be used to position the product dispenser relative to a water source and/or collection container as described above.

The product dispenser of the present invention may be formed from any material having structural integrity and being unreactive to water and solid product. Suitable materials for forming the product dispenser include, but are not limited to, plastics, glass, ceramics, metal or any combination thereof. Desirably, the product dispenser comprises a clear or transparent plastic cover material, which allows a visual inspection of any solid product in the cavity. In one embodiment of the present invention, at least a portion of the product dispenser comprises a transparent material to allow a visual inspection of one or more portions of the product dispenser, desirably, at least the interior of the cavity and any solid product therein.

Figure 1:
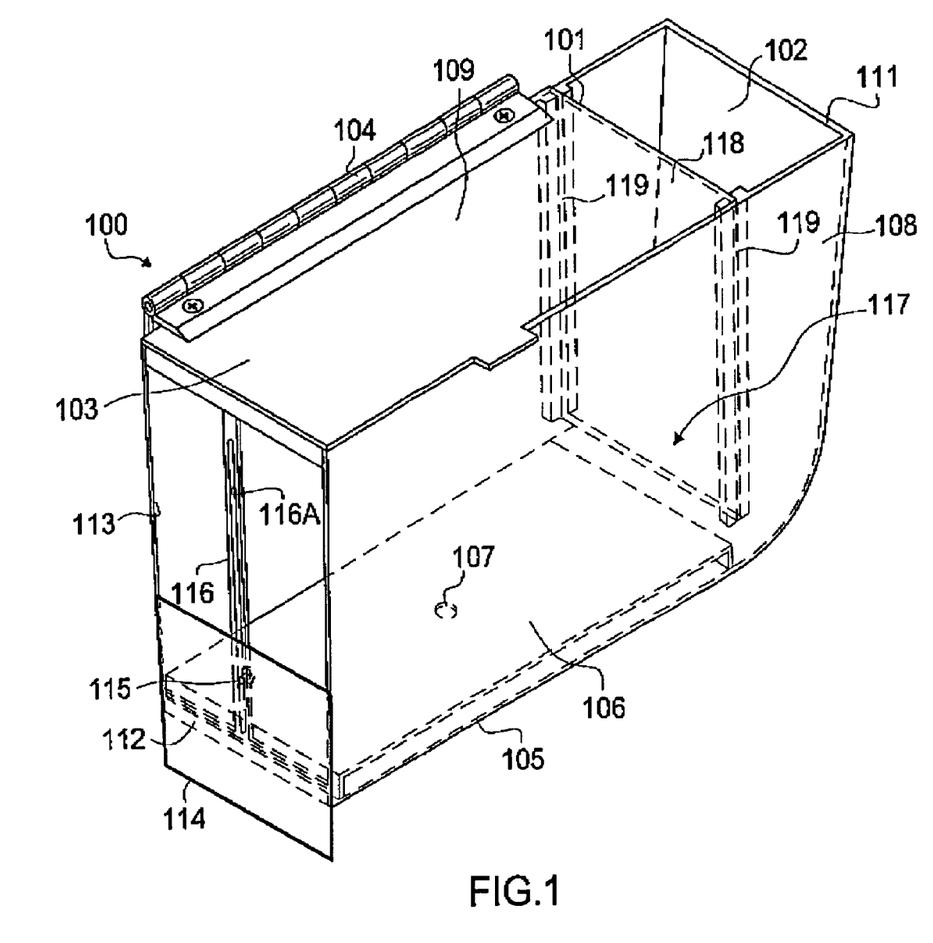
FIG. 1 depicts a frontal view of an exemplary dispenser of the present invention.
Figure 2:
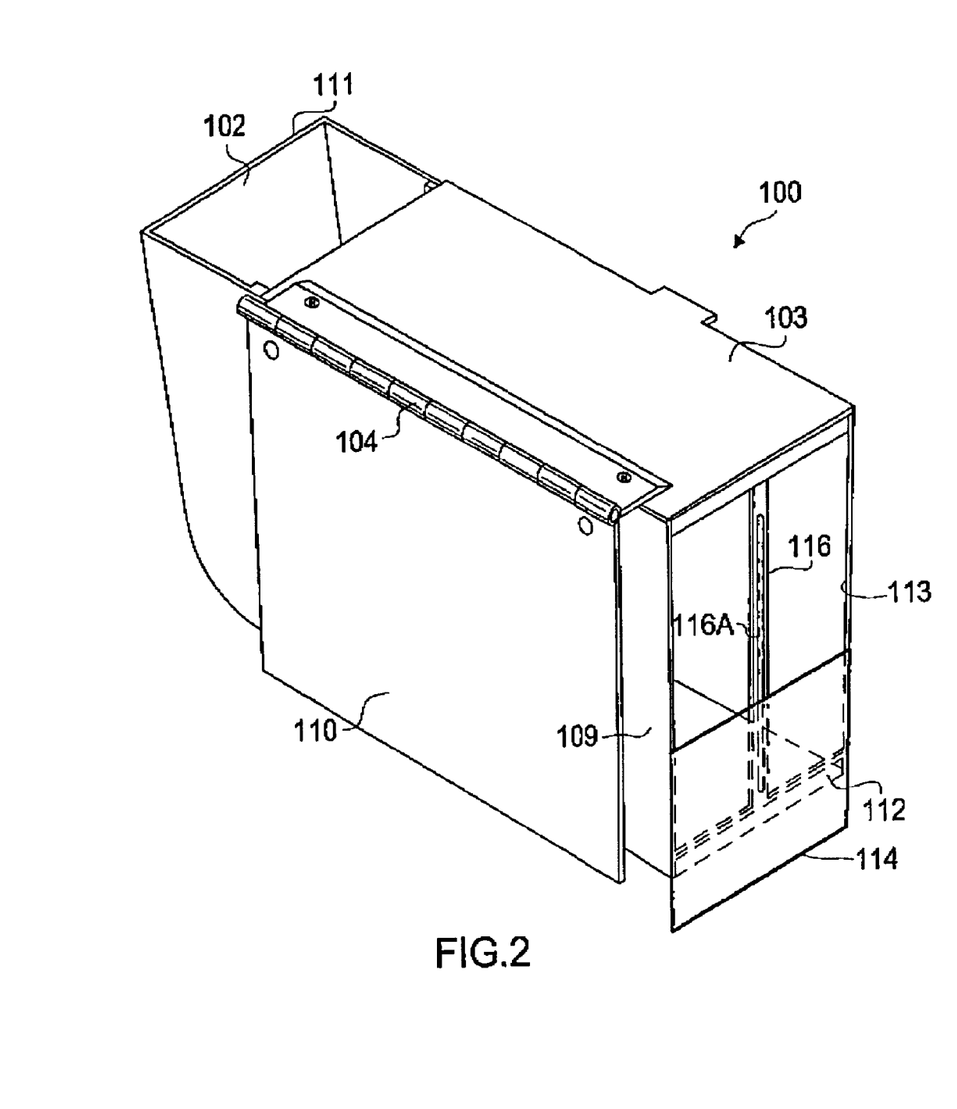
FIG. 2 depicts a rear view of the exemplary dispenser shown in FIG. 1.
Figure 3:
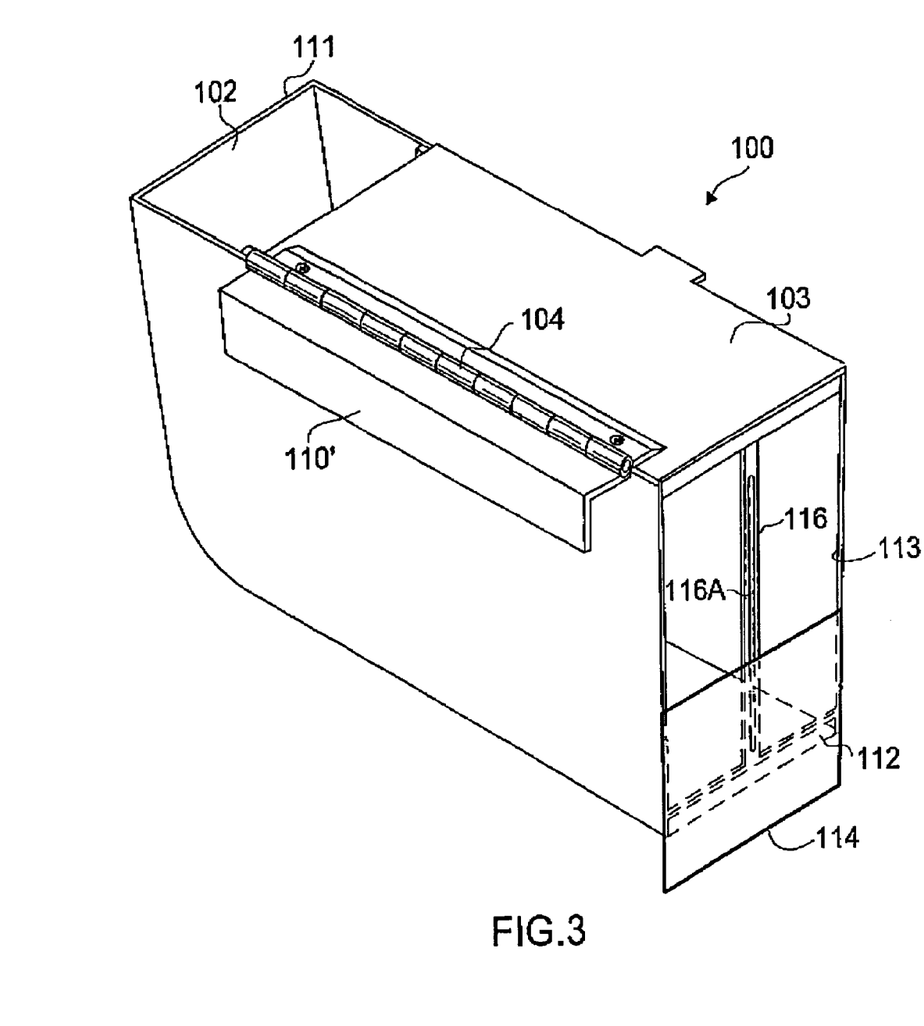
FIG. 3 depicts a rear view of another exemplary dispenser of the present invention.

Exemplary product dispensers of the present invention are shown in FIGS. 1–4. As shown in FIGS. 1–3, exemplary product dispenser 100 includes top 101 with water inlet 102 and cover 103. Water inlet 102 is proximate a right side 111 of product dispenser 100, and cover 103 includes a hinge 104 operatively connected to dispenser 100 proximate the juncture of top 101 and rear side 109. Cover 103 covers an opening of top 101 into cavity 117 of dispenser 100, but does not cover inlet 102. In other words, cover 103 extends across top 101 but terminates along partition 118 where inlet 102 begins. In this exemplary embodiment, inlet 102 remains open; however, it should be understood that cover 103 may also extend over inlet 102 or a separate cover (not shown) may be used to cover inlet 102 if so desired.

As shown in FIG. 1, cavity 117 is defined by front side 108, left side 112, rear side 109, partition 118, and bottom 105 of dispenser 100. Partition 118 divides dispenser 100 into inlet 102 and cavity 117, but partition 118 does not extend all the way to the bottom 105. A space of approximately 1.3 cm. (0.5 in.) in height is provided between the bottom edge of partition 118 and bottom 105. Water entering inlet 102 enters cavity 117 between the bottom edge of partition 118 and bottom 105 of dispenser 100. Partition 118 slides into slots 119 located vertically along front side 108 and rear side 109 of dispenser 100. Partition 118 may be temporarily or permanently attached to slots 119 or may fit snugly within slots 119 (without a separate attachment means, such as an adhesive) to prevent water from passing into cavity 117 along the vertical edges of partition 118.

On the left side 112 of dispenser 100, there is an adjustable overflow outlet 113 and a track 116 having a slot 116*a* opposite inlet 102. Outlet 113 is an open area within left side 112 of dispenser 100. Track 116 is a rectangular bar extending from bottom 105 to top 101 proximate the middle of left side 112, and slot 116*a* runs vertically along track 116. An overflow adjustment plate 114 is vertically slidable along track 116 and is secured in place by securing member 115, such as a wing nut or other securing means known in the art. Overflow adjustment plate 114 acts as a partial side to close a bottom portion of outlet 113 and is vertically adjustable to control the dwell time of water solution within product dispenser 110. The higher the height of overflow adjustment plate 114 along left side 112 of dispenser 100, the greater the dwell time and also the greater the degree of contact between the water and solid product (not shown) within cavity 117. The increased dwell time and exposure between the water and the solid product results in a higher concentration of the solid product, which dissolves into the use solution. Conversely, the lower the height of overflow adjustment plate 114 along the left side 112 of dispenser 100, the shorter the dwell time and contact time between the water and the solid product, thereby resulting in a lower concentration of solid product dissolved into the use solution. Use solution above overflow adjustment plate 114 will flow out of outlet 113 while water and/or use solution below overflow adjustment plate 114 will flow out of drain hole 107. Although outlet 113 is located on the left side 112 in this exemplary embodiment, it should be noted that outlet 113 may be located on any of sides 108, 109 or 112. (Further, as described above, the dimensions of outlet 113 can also be fixed in some embodiments of the present invention.)

A product support member 106, such as a foil, film or screen, may be placed within cavity 117 such that at least a portion of support member 106 is above bottom 105 of dispenser 100. A solid product (not shown) is placed on top of product support member 106 to prevent the solid product from resting directly on the bottom 105, which prevents the solid product from dissolving when product dispenser 100 is not in use. Drain hole 107 is located in the bottom 105 to provide an outlet for excess water remaining in the bottom 105 of product dispenser 100 when product dispenser 100 is not in use. Therefore, although a small amount of water may remain, product dispenser 100 is mostly empty of water when not in use and product support member 106 prevents any remaining water from contacting the solid product. Drain hole 107 may vary in size and dimensions, but is typically smaller than outlet 113 to insure some degree of accumulation within product dispenser 100.

In one embodiment of the present invention, drain hole 107 may have an adjustable size to further control the amount of water exiting drain hole 107. The size of drain hole 107 may be adjusted similarly to the overflow outlet 113 as described above or may be adjusted by any other mechanism.

Figure 4:
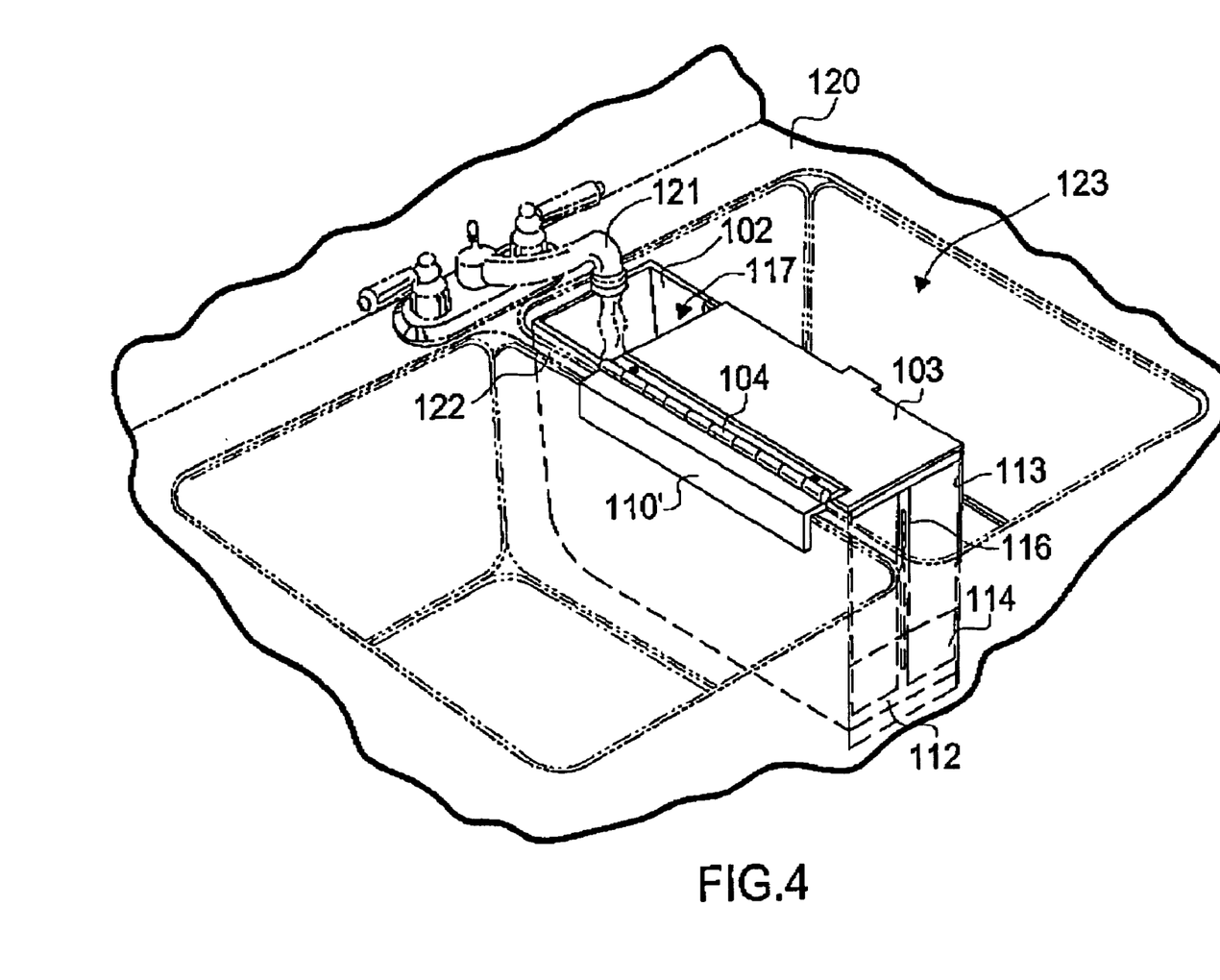
FIG. 4 depicts the exemplary dispenser shown in FIG. 3 in combination with a sink and faucet.

As shown in FIGS. 2–4, a mounting bracket 110 or 110' may be attached to product dispenser 100 proximate the rear side 109. Mounting bracket 110 or 110' may be an arm configured and arranged to engage a partition or ledge 122 of a sink 120, so that product dispenser 100 extends into compartment 123 of the sink 120, and outlet 113 and drain hole 107 empty into compartment 123. Mounting bracket 110 is shown as a flat rectangular member extending outward from and parallel with the rear side 109 and approximately 0.64 cm. (0.25 in.) therefrom to provide a gap between bracket 110 and rear side 109. This 0.64 cm. (0.25 in.) gap allows the partition or ledge 122 of sink 120 to slide within the gap for quick and easy installation of product dispenser 100. Mounting bracket 110' is similar to mounting bracket 110 but does not extend all the way to the bottom of rear side 109. It should be noted that the mounting bracket may be any length and configuration sufficient to engage a mounting surface. In addition, screws or other securing means known in the art may be used with the mounting bracket to temporarily or permanently secure product dispenser 100 as desired. (Further, a mounting bracket may be an integral part of the housing itself or a covering over a portion of the housing as described above.)

If dispenser 100 is used with a sink, such as sink 120 shown in FIG. 4, inlet 102 is placed proximate faucet 121. A natural air gap is provided by the distance between faucet 121 and inlet 102. Sink 120 includes a partition or ledge 122 dividing sink 120 into compartments 123. Product dispenser 100 is placed onto partition 122 to dispense product into one of the compartments 123. Although product dispenser 100 as shown in FIG. 4 is used with sink faucet 121, other water sources may be used to dispense a solid product into a container (i.e., such as a sink) included, but not limited to, a mop bucket, a laundry machine or a pool.

As discussed above, product dispenser 100 may have a size and shape so that the product dispenser matches a given water source and/or a container for collecting the use solution. In one desired embodiment of the present invention, the product dispenser has a rectangular shape as shown in FIGS. 1–4; however, it should be understood that other shapes are within the scope of the present invention. Suitable shapes include, but are not limited to, a circular shape, a square shape, a triangular shape, a star shape, an arrow shape, a rhombus shape, a trapezoid shape, etc. Desirably, the product dispenser has dimensions as follows: an overall height ranging from about 7.6 cm (3.0 inches) to about 45.7 cm (18.0 inches); an overall length (as used herein, the "length" is the dimension parallel with rear side 109 in FIG. 1) ranging from about 15.2 cm (6.0 inches) to about 61.0 cm (24.0 inches); an overall width ranging from about 5.1 cm (2.0 inches) to about 30.5 cm (12.0 inches); a cavity length ranging from about 10.2 cm (4.0 inches) to about 55.9 cm (22.0 inches); a height of the gap under partition 118 ranging from greater than 0 to about 5.1 cm (2.0 inches); a height of an upper edge of overflow plate 114 (i.e., the distance from bottom 105 to an upper edge of overflow plate 114) ranging from about 5.1 cm (2.0 inches) to about 40.6 cm (16.0 inches); and a height of at least a portion of product support member 106 above bottom 105 ranging from greater than 0 to about 40.6 cm (16.0 inches).

In one embodiment of the present invention, the product dispenser comprises a cavity, wherein the cavity has a cross-sectional configuration, which matches a cross-sectional configuration of the solid product to be used in the product dispenser. In this embodiment, the solid product fits into the cavity of the product dispenser in such a way that a user cannot incorrectly input the solid product into the cavity of the product dispenser without altering the configuration of the solid product. Suitable cavity/solid product cross-sectional configurations for use in this embodiment of the present invention include, but are not limited to, a star-like cross-sectional configuration, an arrow cross-sectional configuration, and a diamond cross-sectional configuration. Desirably, the cavity/solid product cross-sectional configuration is an arrow cross-sectional configuration.

Figure 5:
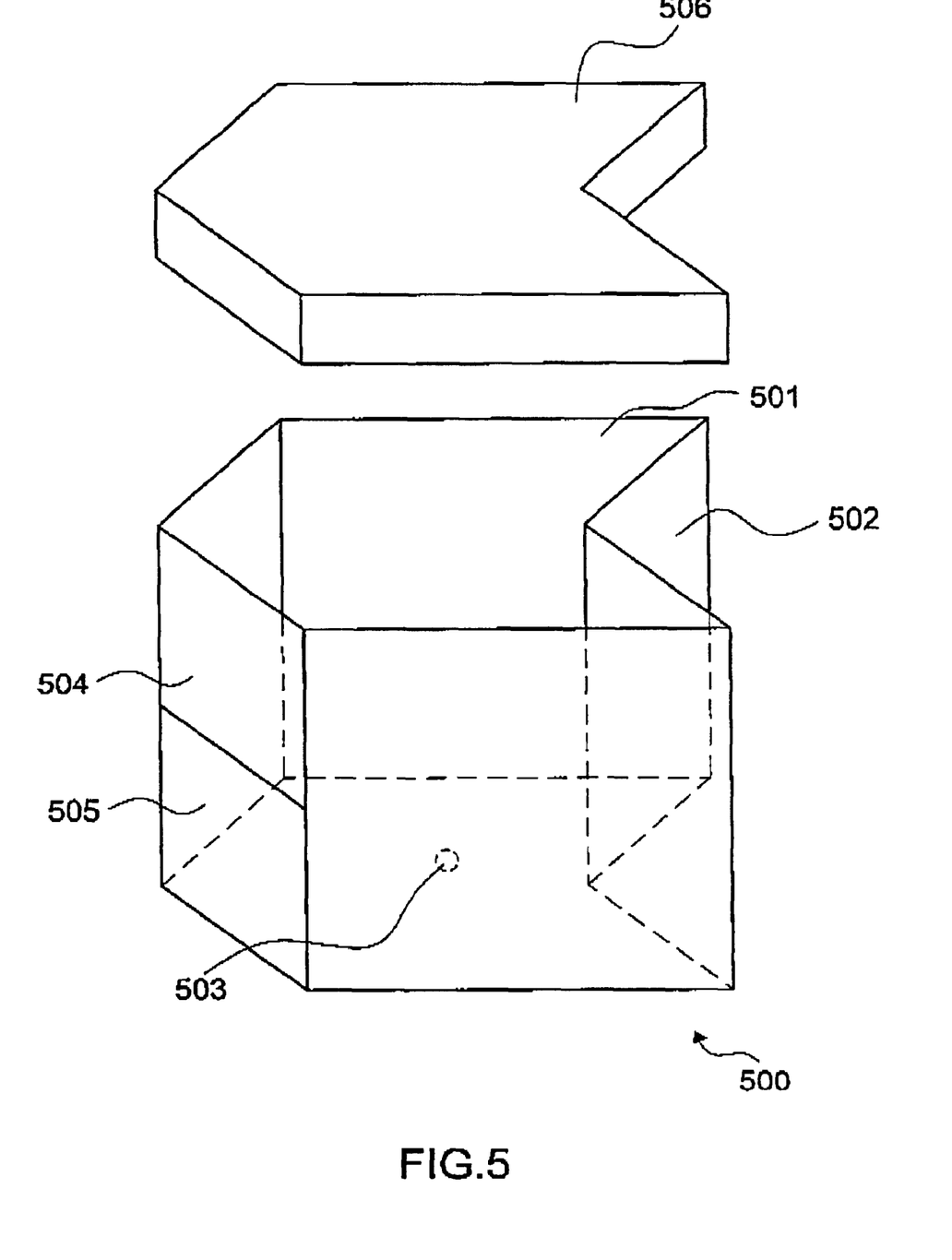
FIG. 5 depicts an exemplary product dispenser and solid product, wherein a cavity of the product dispenser and the solid product have similar cross-sectional configurations.

An exemplary product dispenser/solid product system, wherein the cavity and of the product dispenser and the solid product have a similar cross-sectional configuration, is shown in FIG. 5. Product dispenser 500 comprises a cavity 501, a water inlet 502, a drain hole 503, and an outlet 504 in side wall 505. Product dispenser 500 may further comprise other components as described above; however, such additional components are not shown in FIG. 5 in order to clearly depict the relationship between cavity 501 and solid product 506. As shown in FIG. 5, both cavity 501 and solid product 506 have an arrow-like cross-sectional configuration. Such a cross-sectional configuration system offers a user only one method of inputting solid product 506 into cavity 501 without altering the shape of solid product 506.

Although it is not clear from FIG. 5, it is desirable for solid product 506 to have dimensions slightly smaller than the dimensions of cavity 501 so that solid product 506 slides easily into cavity 501. Typically, solid product 506 and cavity 501 have dimensions such that a gap is formed between an outer edge of solid product 506 and a surface of cavity 501. Desirably, the gap has an average width of from about 0.3 cm. (0.125 in.) to about 1.3 cm. (0.5 in.), more desirably, from about 0.3 cm. (0.125 in.) to about 0.6 cm. (0.25 in.); however, the gap may have an average width outside of these desired ranges.

Product dispenser 100 accurately dispenses cleaning and sanitizing products using a low cost and easy to install product dispenser. The product dispenser is ideal for three-compartment sinks commonly used in restaurants, but many other applications are also possible. The product dispenser is readily mountable to a variety of surfaces such as a sink, a wall, or a laundry machine. Other uses and applications where dispensing of a solid product is desired are also possible with the present invention, and the product dispenser could be used with a variety of containers. In one embodiment, a conduit (not shown) may be attached to outlet 113 and a conduit (not shown) may be attached to drain hole 107 to direct the use solution into a container if there is a distance between the water source (such as faucet 121) and the container. Because of the easy installation and the easy use of the product dispenser, plumbing regulatory issues are reduced or even eliminated and installation costs are minimal since the end customer can readily install the product dispenser. In addition, since there are no moving parts or electrical components in product dispenser 100, service costs are also minimal.

II. Solid Product

The present invention is also directed to solid products for use in the above-described product dispensers. The solid products comprise one or more water-dissolvable components, which are formed into a desired shape having a desired size. The solid products may have any shape or size suitable for use in the product dispensers. For example, the solid products may be in the form of pellets, beads or powders having a size such that hundreds of pieces of solid product fill a given product dispenser. The pellets, beads or powders may be shaped into larger pieces of solid product such that only one or a dozen pieces of solid product fit within a given product dispenser. Typically, the solid products have a rectangular, square, triangular, circular, arrow-like, rod-like, or star-like shape as described above. Desirably, the solid products have a rectangular, square, or arrow-like shape.

In one desired embodiment of the present invention, the solid product has a size, which enables one or more pieces of solid product to be placed within the cavity of the product dispenser, wherein each piece of solid product has a configuration, which increases the surface area of the piece of solid product. For example, a solid product may have a rectangular or square shape, and also have one or more holes through the rectangular or square shape in a direction parallel or perpendicular to a horizontal axis of the solid product. Other solid product configurations may include fins or slots within the product to increase the surface area of the product.

Figure 6A:
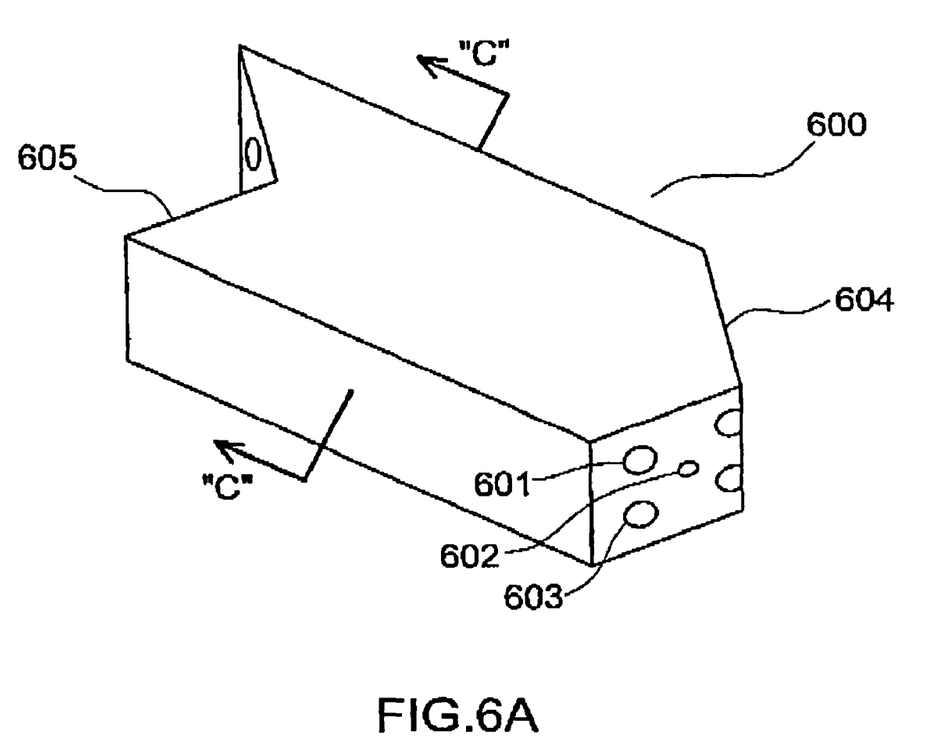
FIG. 6A depicts an exemplary solid product having increased surface area.
Figure 6B:
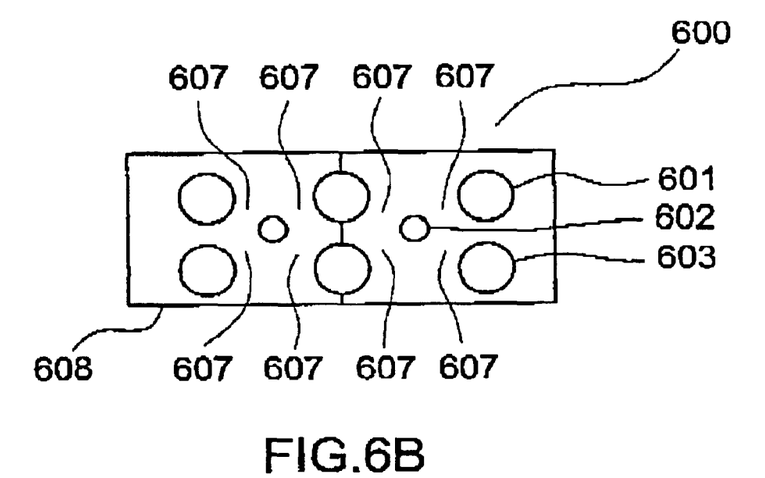
FIG. 6B depicts a view of the exemplary solid product of FIG. 6A along line "C—C" shown in FIG. 6A.

An exemplary solid product having increased surface area is shown in FIGS. 6A and 6B. As shown in FIGS. 6A and 6B, solid product 600 has three rows of holes 601, 602, and 603 extending through solid product 600 from end 604 to opposite end 605. The holes result in an increased surface area for possible contact with water flowing through the cavity of the product dispenser. As shown in FIG. 6B, the three rows of holes comprise an upper row 601 having three holes of similar diameter and a lower row 603 having three holes of similar diameter to the hole in upper row 601. The holes within middle row 602 have similar diameters, which are smaller than the hole diameters of the holes in rows 601 and 603. This particular configuration of holes enables the formation of "pillars" in solid product 600 at locations 607 as solid product 600 dissolves from lower surface 608. As solid product 600 dissolves from lower surface 608, holes in row 603 become exposed to water, and loose their circular shape. At a point where an upper portion of the holes in row 603 and a lower portion of the holes in row 602 are contacted by water, pillars are formed at locations 607. Likewise, at a point where an upper portion of the holes in row 602 and a lower portion of the holes in row 601 are contacted by water, pillars are formed at locations 607.

It should be noted that the number of holes, the shape of holes, the size of holes, the number of rows of holes, the combination of different hole sizes, and the combination of hole shapes may be varied as desired in the solid products of the present invention. In some solid products, a higher density of smaller holes may be desired, while other solid products may advantageously have a lower density of smaller holes or larger holes.

In one desired embodiment of the present invention, the solid product has a hole configuration as shown in FIGS. 6A and 6B. The solid product may have any shape, but desirably, has a rectangular, diamond or arrow shape. In this embodiment, the solid product has a height of about 5.1 cm. (2.0 in.), a width of about 7.6 cm. (3.0 in.), a depth of about 17.8 cm. (7.0 in.), three rows of holes as shown in FIGS. 6A and 6B, wherein each hole in the upper row of holes and the lower row of holes (i.e., total of six holes) have a hole diameter of about 1.3 cm. (0.5 in.), and each hole in the middle row of holes (i.e., total of two holes) have a hole diameter of about 0.6 cm. (0.25 in.). Desirably, the solid product has the above-described dimensions and an arrow shape for use with a product dispenser having a coordinated arrow-shaped cavity.

The solid products may comprise one or more water-dissolvable components. Suitable water-dissolvable components include, but are not limited to, components selected from detergents, surfactants, sanitizers, pest control agents, or a combination thereof. Suitable solid products include, but are not limited to, products disclosed in U.S. patent application Ser. No. 09/282,001, filed on Mar. 29, 1999 entitled "SOLID POT AND PAN DETERGENT" and assigned to Ecolab Inc. (St. Paul, Minn.), the entire contents of which are herein incorporated by reference. Desirably, the solid product comprises a pot and pan type detergent, such as the MAGFUSION Product, available from Ecolab Inc. (St. Paul, Minn.).

Solid products having an increased surface area may be formed from any of the water-dissolvable components described above. In addition, solid products having an increased surface area may be formed from commercially available solid products including, but not limited to, the MAGFUSION Product from Ecolab Inc. (St. Paul, Minn.).

III. Dispensing Systems

The present invention is further directed to dispensing systems comprising the above-described product dispensers and solid products. In one embodiment of the present invention, the dispensing system comprises (i) a product dispenser comprising a housing having a cavity configured and arranged to receive a solid product, the housing having a bottom, a top, and at least one side defining the cavity; an inlet for inputting water into the housing, wherein the inlet and cavity are configured to provide fluid flow between the inlet and the cavity; a support member positioned within the cavity, wherein at least a portion of the support member is positioned at a distanced, above the bottom of the housing; an outlet on a first side of the housing; and a drain hole on the bottom of the housing; and (ii) a solid product positioned on the support member.

In one desired embodiment of the present invention, the dispensing system comprises (i) a product dispenser having a cavity, and (ii) a solid product, wherein the cavity and solid product have substantially similar cross-sectional configurations. In this embodiment, the solid product fits into the cavity in such a way that a user instantaneously knows how to input the solid product. Desirably, the cavity and the solid product have a cross-sectional configuration in the shape of an arrow. Further, the solid product desirably has an increased surface area resulting from one or more holes through the solid product as described above and depicted in FIGS. 6A and 6B.

The dispensing system may be used in a variety of applications where a use solution is desired. Typically, the dispensing system is positioned at a location within a residential, commercial or industrial property for easy access for a user. One or more pieces of solid product are positioned within the product dispenser and replaced as needed. In some applications, the solid product is used for a single batch operation. In other applications, solid product is used on more of a continuous basis, such that additional solid product is placed into the product dispenser on a regular basis.

When solid product is placed in the product dispenser, it is desirable for the solid product to have a total volume equal to or less than a cavity volume bordered by the top of the housing, the support member, and the at least one side of the housing. One or more pieces of solid product may be used to fill the cavity volume. Desirably, the one or more pieces of solid product may be stacked one on top of the other to fill the cavity volume, and also provide a consistent surface area of solid product within a horizontal plane of solid product as one moves along a vertical direction within the product dispenser cavity. Such a configuration enables a consistent dispersion of solid product into the water, which contacts the solid product.

As discussed above, the product dispenser may have any dimensions necessary for a given application. For more continuous applications wherein an amount of solid product is used on a continuous basis, the dimensions of the product dispenser may be selected such that the cavity has relatively small cross-sectional dimensions when compared to the height of the cavity. In this embodiment, numerous solid products may be stacked on top of one another.

The dispensing rate of the product dispensing system and the concentration of the resulting use solution are determined by a number of factors including, but not limited to, the water flow rate, the water temperature, the dissolving rate of the solid product, the surface area of the solid product exposed to the water, and the contact time between the water and the solid product. By varying one or more of the above variables, a desired dispensing rate and use solution concentration is obtained.

IV. Methods of Making a Liquid Use Solution

The present invention is further directed to a method of making a liquid use solution comprising: (i) positioning a product dispenser, a water source, and a container relative to one another, wherein the product dispenser comprises: (a) a housing having a cavity configured and arranged to receive a solid product, the housing having a bottom, a top, and at least one side defining the cavity; (b) an inlet for inputting water into the housing, wherein the inlet and the cavity are configured so as to provide fluid flow between the inlet and the cavity; (c) a support member positioned within the cavity, wherein at least a portion of the support member is positioned at a distanced, d, above the bottom of the housing; (d) an outlet on a first side of the housing; and (e) a drain hole on the bottom of the housing; (ii) placing one or more pieces of solid product on the support member of the product dispenser; (iii) passing water from the water source through the product dispenser such that the water comes into contact with the solid product and exits the outlet on the first side of the housing as a use solution; and (iv) collecting the use solution in the container.

The method may be practiced using a variety of water sources including, but not limited to, a faucet, a water hose, a water valve, a water pump, or a bucket of water. The product dispenser may be designed to couple directly or indirectly to one or more of the above-mentioned water sources. Attachment means and/or brackets, such as those described above, may be use to temporarily or permanently position the product dispenser relative to the water source.

The method may produce a use solution for collection in a variety of container types. Suitable containers for collecting the use solution include, but are not limited to, a sink, a bucket, a laundry machine, a sauna, or a pool. In one desired embodiment of the present invention, the method produces a use solution, wherein the water source is a faucet, and the container is a sink having a sink partition dividing the sink into at least two compartments.

The method of the present invention may be further described with reference to FIGS. 1–4. In an exemplary operation (shown in FIG. 4), product dispenser 100 is placed proximate faucet 121 so that water enters inlet 102. Product dispenser 100 is a flood-type dispenser. Water-dispersible solid product is dispensed concurrently as sink compartment 123 is filled with water and/or use solution. Water fills cavity 117 faster than water and/or use solution exits drain hole 107. Therefore, the flooding of cavity 117 allows water to contact the solid product, thereby dissolving a portion of the solid product to create the use solution. In this exemplary embodiment, outlet 113 and drain hole 107 each independently empty into sink compartment 123; however, it should be noted that either of outlet 113 and drain hole 107 may be emptied into another type of container, such as bucket (not shown). If product dispenser 100 empties into sink compartment 123, mounting bracket 110 or 110' may be placed about the sink partition or ledge 122. If the product dispenser empties into a bucket, mounting bracket 110 or 110' may be placed on a vertically oriented surface proximate the bucket or on an edge of the bucket. Alternatively, mounting bracket 110 or 110' may be modified for attaching to a wall. Again, a conduit may be used to carry the use solution from product dispenser 100 into a container or a bucket.

The solid product is dissolved during the dispensing cycle when water enters inlet 102, and adjustable plate 114 is adjusted so that water comes into contact with the solid product being dispensed. The solid product is placed on support member 106, and water flows from faucet 121 into inlet 102 and then into cavity 117 from the bottom 105. Partition 118 ensures that water enters cavity 117 from the bottom 105 of product dispenser 100. As water floods cavity 117 from the bottom 105 of product dispenser 100, the water rises above support member 106 to contact the solid product. A portion of the solid product dissolves into the water to form a use solution. The use solution exits product dispenser 100 through outlet 113 and drain hole 107. Overflow adjustment plate 114, when present, may slide vertically along track 116 and may be secured with securing member 115 to allow a desired amount of use solution to be dispensed. The longer the solid product is exposed to water, the more solid product will dissolve to create the use solution and the converse is also true. Therefore, the higher overflow plate 114, the longer the water will contact the solid product and vice versa.

To stop the dissolving process between uses, drain hole 107 in the bottom 105 of product dispenser 100 allows most of the water to exit product dispenser 100. This allows the solid product to dry between dispensing cycles to ensure that a desired concentration is dispensed each time. Although drain hole 107 is always open, water accumulates within cavity 117 faster than water drains through drain hole 107, thereby allowing cavity 117 to flood with water. As described above, the rate of accumulation may be varied by adjusting the size of drain hole 107, adjusting the position of overflow adjustment plate 114, or both.

When used with sink 120 (see FIG. 4), installation of product dispenser 100 is quick and easy because mounting bracket 110 or 110' may be placed about sink partition 122 such that inlet 102 is positioned underneath faucet 121 whenever dispensing of the solid product is desired. After the solid product has been dispensed, product dispenser 100 can be removed from sink partition 122 or simply positioned out of the way of faucet 121. A restrictor (not shown) could also be used to prevent removal of product dispenser 100 from sink 120 to insure that the use solution flows into the proper compartment during the dispensing cycle.

The method of the present invention may be used to prepare a use solution having a desired concentration of solid product within an aqueous solution. A number of variable may be considered to obtain a desired use solution concentration including, but not limited to, the water flow rate, the dwell time of the water within the cavity of the product dispenser, the contact time between the water and the solid product, the water temperature, the dissolving rate of the solid product, the chemical formulation of the solid product, the shape of the solid product, the amount of surface area of the solid product, the height of the adjustable outlet, and the water flow rate out of the drain hole. By adjusting one or more of the above variables, a desired use solution concentration may be obtained.

Water flow rate is one important consideration in obtaining a desired use solution concentration. A controlled water flow is desirable to control the contact between the water and the solid product. In the exemplary embodiments shown in FIGS. 1–4, a partition is used to control the influx of water from inlet 102 into cavity 117. This particular design forces the water flow to turn a corner and come up under the solid product. It should be understood that other designs may be used to control water flow and the method of contacting the solid product. One possible alternative is to have the water fall directly on the solid product or by removing some or all of partition 118. One further possible alternative is to incorporate slots or holes at one or more locations within partition 118 to direct water toward the solid product in a controlled manner. The water flow and contact time may also be adjusted by changing the size of the holes in the product support member 106. Further, water flow may be controlled by increasing or decreasing the size of the product dispenser and any of its components. In addition, the water flow may be controlled by restricting the supply of water to the product dispenser though the use of valves and/or flow regulator devices.

Water temperature changes may also effect the concentration of the use solution. Some water-dissolvable components in the solid product may have a dissolution rate, which is temperature dependent. If desired, a water temperature process control device may be used to monitor the water temperature and adjust water flow rate as the temperature changes. For example, a water flow compensating device may be use, wherein the device would cause more water to bypass the solid product (i.e., passing through drain hole 107) as the temperature increased. Other devices may be used to heat the water prior to or after entering the product dispenser.

The contact time between the water and the solid product is a key factor in the method of preparing a use solution. If the water flows past the solid product too fast, the contact time may be insufficient to dissolve the solid product. To compensate for this, the product dispenser is designed to increase the level of solid product exposure to the water automatically as the water flow rate increases. This is accomplished by managing the geometry of the outlet opening. As the water flow rate increases, the outlet opening restricts the water from exiting the product dispenser. This restriction causes the water to back up in the product dispenser. As the water backs up, the water level in the product dispenser rises. The higher water level results in more of the solid product being exposed to the water, increasing the dispensing rate of the solid product. Therefore, there is a built in compensation for higher water flow rates that allows the product dispenser to maintain more accurate dispensing rates at different water flow rates.

The chemical formulation and product design of the solid product also affect the concentration of the use solution. The dissolving rate of the solid product may be affected by one or more of the following factors: the formulation of the solid product, the shape of the solid product, the density of the solid product, and the method of exposing the solid product to water. Desirably, a homogeneous solid product of a known dissolving rate is used to produce a consistent product dispensing rate.

The surface area of the solid product exposed to the water affects the dispensing rate because contact with the water causes the solid product to dissolve. Therefore, for a given water level in the product dispenser, as the solid product size increases, the surface area increases and the dispensing rate increases. However, the surface area may be increased without increasing the overall size of the solid product as described above. In an effort to minimize the size of the solid product and the product dispenser, holes may be drilled or molded into the solid product shape to increase the surface area. Desirably, holes are formed in the solid product during an extrusion process. The water then comes into contact with the outer surfaces of the solid product as well as the inner surfaces of the holes in the solid product. The increased surface area of the solid product exposed to water increase the dispensing rate of the solid product. Fins or grooves may also be used as a means to increase the solid product surface area without changing the overall size of the solid product shape.

As the product is dispensed the surface area of the product may change. As the surface area changes, the amount of solid product dissolved by the water also changes and therefore the dispensing rate changes. In order to control the dispensing rate as accurately as possible, the change in surface area is desirably minimized throughout the method of making a use solution. Several methods may be used to accomplish this. One method is to strategically produce a solid product having holes therein such that as the solid product dissolves, the surface area exposed to water stays substantially the same. For example, when the outside of a solid product shape dissolves, the surface area is reduced; however, the inside of the holes are also dissolving so the holes are getting bigger and therefore the surface area of the holes is increased. It is possible to balance the change in surface areas (i.e., decreasing outer surface area and increasing hole surface area) to minimize the overall change in dispensing rate. One example of such a balance is described above and depicted in FIGS. 6A and 6B.

A second method of controlling the change in surface area of the solid product is to utilize a finned or star-shaped solid product. As the fins dissolve, the surface area change is minimized because the fin length does not change.

A third method is to reduce the amount of solid product exposed to the water. In one embodiment of the present invention, a long rod-shaped solid product may be used. In this embodiment, as the solid product dissolves from the bottom, the rod forms a cone on the bottom. The cone has a different surface area than the original rod. The cone is longer as the height of the water on the rod is increased. By reducing the height of the water in relation to the rod, the cone that forms may be minimized. Consequently, the change in surface area of the solid product may be minimized.

Another area of consideration when looking at the solid product shape is how the solid product falls when it dissolves. In order for the dispensing rate to be as consistent as possible during operation, the surface area of the solid product exposed to water desirably stay substantially the same as the solid product moves from an old piece of solid product to a new piece of solid product within the product dispenser. Desirably, the pieces of solid product are stacked in the product dispenser so that a user has a constant supply of solid product available for dispensing. As the solid product dissolves, the solid product shape and the product dispenser enable the operation to move smoothly from one piece of solid product to the next. The shape of the solid product is desirably such that the remains of the lower solid product shape does not inhibit the upper solid product shape from falling into place for contact with water. Using holes in the solid product shape is one method of assuring that the upper solid product shape falls into place (such as described above and depicted in FIGS. 6A and 6B). The holes may be positioned in the solid product shape to allow the shape to have weak spots, which collapse and allow the upper solid product to move into a position, which allows dispensing to occur.

After a dispensing cycle has been completed, if the water is allowed to remain in contact with the solid product, the solid product will continue to dissolve. To prevent this a small drain hole (typically, about 0.64 cm (0.25 in) in diameter) is put in the bottom of the dispenser to allow the water to drain out of the dispenser within a desired length of time, typically less than about 1 minute. The drain hole may also be used to control the concentration of the resulting use solution by adjusting the size of the drain hole. If the drain hole is increase (or decrease) in size, the concentration of the resulting use solution decrease (or increases) due to the shorter dwell time of water in the product dispenser and the contact time with the solid product.

In one embodiment of the present invention, the method of making a use solution comprises producing a use solution, which is collected in a container such as a sink, a bucket, a laundry machine, a pool, or other container. When used with a laundry machine, the water source providing water into the wash bin of the laundry machine would act as the water source and the dispenser would be mounted proximate this water source. The mounting surface for the dispenser could be a ledge or partition on a sink, a side of a bucket, a wall, a side of a laundry machine, the faucet itself, piping, fixtures, or any other surface proximate the container into which the product is to be dispensed. A mounting bracket operatively connected to the product dispenser may be a flat rectangular member for mounting onto a sink ledge or partition, a rounded member for mounting onto a side of a bucket, or a member adapted to dispense mounted onto a wall or another surface within the vicinity of the water source.

In a further embodiment of the present invention, the method of making a use solution comprises producing a use solution for a "warewash" machine. A warewash machine is a commercial dish washing machine used in businesses, such as restaurants, to wash "ware," including, but not limited to, dishes, silverware, glasses, pots and pans.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLE 1

Preparation of a Use Solution Using a Product Dispenser

MAGFUSION Product available from Ecolab Inc. (St. Paul, Minn.) was placed into a product dispenser having a design as shown in FIG. 1. The product dispenser had the following dimensions:

- overall height—17.8 cm (7.0 inches)
- overall length[1]—27.9 cm (11.0 inches)
- overall width—10.2 cm (4.0 inches)
- cavity length—20.3 cm (8.0 inches)
- height of gap under partition—1.3 cm (0.5 inches)
- height of top edge of overflow plate 114—20.3 cm (3.8 inches)
- height of product support member 106 above bottom 105—1.3 cm (0.5 inches)

Enough MAGFUSION product was placed into the dispenser to fill the product dispenser cavity (about 2 pieces of MAGFUSION product having a 7.6 cm (3.0 inches) height X 19.1 cm (7.5 inches) length X 8.9 cm (3.5 inches) width rectangular shape). The product dispenser was mounted on a sink directly below the water source. The water source was turned on to start filling the product dispenser. The product dispenser filled such that water came into contact with a lower portion of the MAGFUSION solid product. Water overflowed out of the product dispenser into the sink.

The water supply was adjusted to a flow rate of from 30.3 liters per minute (lpm) (8 gallons per minute (gpm)) to about 75.7 lpm (20 gpm). During the run, water temperature was adjusted to range from about 12.8° C. (55° F.) to about 82.2° C. (180° F.). The final concentration of MAGFUSION product was from about $3.74 \times 10^{-4}$ grams of product per cubic centimeter of water ($g/cm^3$) (0.05 oz/gal) to about $7.49 \times 10^{-4}$ $g/cm^3$ (0.1 oz/gal).

EXAMPLE 2

Preparation of a Use Solution Using a Product Dispenser

A MAGFUSION Product was extruded to produce a solid product having an array of holes as shown in FIGS. 6A and 6B, namely, three rows of holes wherein the upper and lower rows contained three holes each having the same hole diameter, and a middle row, which contained two holes having a smaller diameter. The product was then cut to form an arrow shape as shown in FIGS. 5, 6A and 6B. The dimensions of the solid product are given below:

- a height of 5.1 cm. (2.0 in.)
- a width of 7.6 cm. (3.0 in.)
- a depth of 17.8 cm. (7.0 in.)
- a hole diameter of 1.3 cm. (0.5 in.) for holes in the upper and lower rows
- a hole diameter of 0.6 cm. (0.25 in.) for holes in the middle row A product dispenser having a design as shown in FIG. 5 was used along with the arrow-shaped MAGFUSION Product. The product dispenser had the following dimensions:

- overall height—17.8 cm (7.0 inches)
- overall length[2]—19.1 cm (7.5 inches)
- overall width—8.9 cm (3.5 inches)
- cavity length—18.4 cm (7.25 inches)
- cavity width—8.3 cm (3.25 inches)
- height of gap under partition—1.3 cm (0.5 inches)
- height of top edge of overflow plate 114—2.5 cm (1.0 inches)
- height of product support member 106 above bottom 105—1.3 cm (0.5 inches)

Three pieces of the MAGFUSION product having increased surface area were placed into the dispenser to fill the product dispenser cavity. The product dispenser was mounted on a sink directly below the water source. The water source was turned on to start filling the product dispenser. The product dispenser filled such that water came into contact with a lower portion of the MAGFUSION solid product. Water overflowed out of the product dispenser into the sink.

The water supply was adjusted to a flow rate of from 30.3 liters per minute (lpm) (8 gallons per minute (gpm)) to about 75.7 lpm (20 gpm). During the run, water temperature was adjusted to range from about 12.8° C. (55° F.) to about 82.2° C. (180° F.). The final concentration of MAGFUSION product was from about $3.74 \times 10^{-4}$ grams of product per cubic centimeter of water ($g/cm^3$) (0.05 oz/gal) to about $7.49 \times 10^{-4}$ $g/cm^3$ (0.1 oz/gal).

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A detergent dispensing system comprising:
   (i) a product dispenser comprising:
      a housing having a cavity configured and arranged to receive a solid product, the housing having a bottom and at least one side defining the cavity, wherein the cavity has a first cross-sectional configuration as measured within a horizontal plane within the cavity;
      an inlet for inputting water into the housing, wherein the inlet the cavity are configured so as to provide fluid flow between the inlet and the cavity;
      a support member positioned within the cavity, wherein at least a portion of the support member is positioned at a distance, d, above the bottom of the housing;
      an outlet on a first side of the housing, wherein the outlet is positioned at a height, h, above the bottom of the housing, wherein h is greater than or equal to d in length; and
      a drain hole on or near the bottom of the housing; and
   (ii) a solid product comprising a pot and pan detergent.

2. The dispensing system of claim 1, wherein the solid product has a second cross-sectional configuration substantially similar to the first cross-sectional configuration such that when the solid product is placed into the cavity, a gap of less than about 1.3 cm. (0.5 in.) exists between an outer perimeter of the solid product and an inner surface of the cavity.

3. The dispensing system of claim 1, wherein the solid product has a height, a length, a width, a first end, a second end opposite the first end, and at least one hole extending along the length of the solid product from the first end to the second end.

4. The dispensing system of claim 2, wherein the solid product has two or more rows of holes extending along the length of the solid product from the first end to the second end, wherein each row contains one or more holes.

5. The dispensing system of claim 4, wherein the solid product has three or more rows of holes extending along the length of the solid product from the first end to the second end, wherein each row contains two or more holes.

6. The dispensing system of claim 5, wherein the solid product has three rows of holes extending along the length of the solid product from the first end to the second end, wherein an upper row and a lower row each contain three holes, and a middle row contains two holes.

7. The dispensing system of claim 6, wherein the holes in the upper row and the lower row have a first hole diameter, and the holes in the middle row have a second hole diameter smaller than the first hole diameter.

8. The dispensing system of claim 2, wherein the cavity and the solid product have first and second cross-sectional configurations having an arrow, diamond or star shape.

9. The dispensing system of claim 7, wherein the cavity and the solid product have first and second cross-sectional configurations having an arrow shape.

10. The dispensing system of claim 1, further comprising a bracket, wherein the bracket is an arm configured and arranged to engage a ledge of a partitioned sink, an edge of a bucket, or an edge of a container.

11. The dispensing system of claim 10, wherein the bracket is a continuous part of the housing.

12. The dispensing system of claim 1, wherein the outlet includes an overflow adjustment plate, wherein the overflow adjustment plate moves vertically along a track in the first side of the housing to control the height of the water in the product dispenser.

13. The dispensing system of claim 1, further comprising a partition positioned vertically within the housing, wherein the partition separates the cavity from the inlet, and wherein the fluid flow between the inlet and the cavity is beneath a lower edge of the partition.

14. The dispensing system of claim 1, further comprising a removable covering along a top of the housing, wherein the removable covering expands an area having a perimeter outlined by the partition and the at least one side of the housing.

15. The dispensing system of claim 1, wherein the housing comprises a plastic material, which allows a visual inspection of an interior area within the cavity.

16. The dispensing system of claim 1, wherein the solid product comprises one or more pieces of solid product, wherein the one or more pieces of solid product are positioned within the cavity.

17. The dispensing system of claim 2, wherein the gap has a length of from about 0.3 cm. (0.125 in.) to about 0.6 cm. (0.25 in.).

18. A method of making a liquid use solution comprising:
(i) positioning the dispensing system of claim 1 relative to a water source;
(ii) placing one or more pieces of the solid product in the cavity of the product dispenser;
(iii) inputting water from the water source into the inlet of the product dispenser such that water comes into contact with the solid product; and
(iv) collecting the use solution in a container.

19. A method of making a liquid detergent solution, said method comprising:
(i) positioning a dispensing system relative to a water source, wherein the dispensing system comprises:
(a) a product dispenser comprising:
a housing having a cavity configured and arranged to receive a solid product, the housing having a bottom and at least one side defining the cavity, wherein the cavity has a first cross-sectional configuration as measured within a horizontal plane within the cavity;
an inlet for inputting water into the housing, wherein the inlet the cavity are configured so as to provide fluid flow between the inlet and the cavity;
a support member positioned within the cavity, wherein at least a portion of the support member is positioned at a distance, d, above the bottom of the housing;
an outlet on a first side of the housing, wherein the outlet is positioned at a height, h, above the bottom of the housing, wherein h is greater than or equal to d in length; and
a drain hole on the bottom of the housing; and
(b) a solid product comprising a detergent;
(ii) placing one or more pieces of the solid product in the cavity of the product dispenser;
(iii) inputting water from the water source into the inlet of the product dispenser such that water comes into contact with the solid product; and
(iv) collecting the use solution in a container.

20. The method of claim 19, wherein the solid product has a second cross-sectional configuration substantially similar to the first cross-sectional configuration such that when the solid product is placed into the cavity, a gap of less than about 1.3 cm. (0.5 in.) exists between the outer perimeter of the solid product and an inner surface of the cavity.

21. The method of claim 19, wherein the water source is selected from a faucet, a water hose, a water valve, a water pump, or a bucket of water, and the container is a sink, a bucket, a laundry machine, a warewash machine, a sauna, or a pool.

22. The method of claim 21, wherein the water source is a faucet, and the container is a sink having a sink partition dividing the sink into at least two compartments.

23. The method of claim 20, wherein a concentration of the use solution is adjusted by one or more steps comprising:
(a) adjusting a flow rate of water through the product dispenser;
(b) adjusting the height, h;
(c) adjusting a hole size of the drain hole; and
(d) using a solid product having holes within portions of the solid product to increase an overall surface area of the solid product.

24. The method of claim 20, wherein the solid product has a height, a length, a width, a first end having a surface area equal to the height times the width, a second end having a surface area equal to the height times the width, and at least one hole extending along the length of the solid product from the first end to the second end.

25. The method of claim 24, wherein the solid product has two or more rows of holes extending along the length of the solid product from the first end to the second end, wherein each row contains one or more holes.

26. The method of claim 24, wherein the solid product has three or more rows of holes extending along the length of the solid product from the first end to the second end, wherein each row contains two or more holes.

27. The method of claim 24, wherein the solid product has three rows of holes extending along the length of the solid product from the first end to the second end, wherein an upper row and a lower row each contain three holes, and a middle row contains two holes.

28. The method of claim 27, wherein the holes in the upper row and the lower row have a first hole diameter, and the holes in the middle row have a second hole diameter smaller than the first hole diameter.

29. The method of claim 20, wherein the cavity and the solid product have first and second cross-sectional configurations having an arrow, diamond or star shape.

30. The method of claim 29, wherein the cavity and the solid product have first and second cross-sectional configurations having an arrow shape.

31. A product dispenser comprising:
- a housing having a cavity configured and arranged to receive a solid product, the housing having a bottom, and at least one side defining the cavity;
- an inlet for inputting water into the housing, wherein the inlet and the cavity are configured so as to provide fluid flow between the inlet and the cavity;
- a support member positioned within the cavity, wherein at least a portion of the support member is positioned at a distance, d, above the bottom of the housing;
- an outlet on a first side of the housing, wherein the outlet is positioned at a height, h, above the bottom of the housing, wherein h is greater than or equal to d in length; and
- a drain hole on the bottom of the housing.

32. The product dispenser of claim 31, further comprising a bracket for positioning the product dispenser relative to a water source.

33. The product dispenser of claim 32, wherein the bracket is an arm configured and arranged to engage a ledge of a partitioned sink, and edge of a bucket, or an edge of a container.

34. The product dispenser of claim 31, wherein the outlet includes an overflow adjustment plate, wherein the overflow adjustment plate moves vertically along a track in the first side of the housing to control a height of the water in the product dispenser.

35. The product dispenser of claim 31, further comprising a partition positioned vertically within the housing, wherein the partition separates the cavity from the inlet, and wherein the fluid flow between the inlet and the cavity is beneath a lower edge of the partition.

36. The product dispenser of claim 35, further comprising a removable covering along a top of the housing, therein the removable covering expands an area having a perimeter outlined by the partition and the at least one side of the housing.

37. The product dispenser of claim 31, wherein the housing comprises a material, which allows a visual inspection of an interior space within the cavity.

38. The product dispenser of claim 31, wherein the drain hole has an adjustable hole size.

39. A detergent dispensing kit, comprising:
- the product dispenser of claim 31; and
- a solid product having a configuration such that it can be positioned within the cavity of the housing.

40. The dispensing kit of claim 39, wherein the solid product and the cavity have substantially similar cross-sectional configurations such that when the solid product is placed into the cavity, a gap of less than about 1.3 cm. (0.5 in.) exists between an outer perimeter of the solid product and an inner surface of the cavity.

41. The dispensing kit of claim 40, wherein the solid product and the cavity have substantially similar cross-sectional configurations having an arrow shape.

42. A method of making a liquid use solution comprising:
- positioning the dispensing kit of claim 39, a water source, and a container relative to one another;
- passing water from the water source through the product dispenser such that the water comes into contact with the solid product and exits the outlet on the first side of the housing as a use solution; and
- collecting the use solution in the container.

* * * * *